United States Patent
Frankeberger et al.

(10) Patent No.: US 7,318,459 B2
(45) Date of Patent: Jan. 15, 2008

(54) METHOD AND APPARATUS FOR CONVEYING FLEXIBLE FABRICS USING DUAL SIDE OUTLETS

(75) Inventors: Michael S. Frankeberger, Blue Springs, MO (US); Steven D. Twombly, Blue Springs, MO (US)

(73) Assignee: Automation Dynamics LLC, Independence, MO (US)

( * ) Notice: Subject to any disclaimer, the term of this patent is extended or adjusted under 35 U.S.C. 154(b) by 270 days.

(21) Appl. No.: 11/042,373

(22) Filed: Jan. 25, 2005

(65) Prior Publication Data

US 2006/0165497 A1    Jul. 27, 2006

(51) Int. Cl.
  *B65B 1/08* (2006.01)
(52) U.S. Cl. .............. 141/67; 406/1; 406/92; 406/156; 406/159
(58) Field of Classification Search ............. 406/1, 406/2, 92, 155, 156, 159, 160, 161; 414/13; 141/67, 68
See application file for complete search history.

(56) References Cited

U.S. PATENT DOCUMENTS

| | | | |
|---|---|---|---|
| 3,667,087 A * | 6/1972 | Dakin et al. ............... 19/105 |
| 3,671,078 A * | 6/1972 | Wise ......................... 406/3 |
| 3,747,985 A | 7/1973 | Merkel et al. |
| 3,951,461 A | 4/1976 | De Feudis |
| 3,980,166 A | 9/1976 | De Feudis |
| 4,013,551 A * | 3/1977 | de Feudis ................. 209/606 |
| 4,076,321 A | 2/1978 | Haight et al. |
| 4,136,778 A | 1/1979 | Wortman et al. |
| 4,194,859 A | 3/1980 | Boon et al. |
| 4,195,498 A | 4/1980 | Pellerin |
| 4,422,565 A | 12/1983 | Reba |
| 4,676,325 A | 6/1987 | Yamano et al. |
| 4,753,353 A * | 6/1988 | Kramer ..................... 209/570 |
| 4,849,999 A | 7/1989 | Humphreys et al. |
| 4,971,135 A | 11/1990 | Bailey et al. |
| 5,065,928 A | 11/1991 | Davey et al. |
| 5,083,704 A | 1/1992 | Rounthwaite |
| 5,212,969 A | 5/1993 | Tsubaki et al. |
| 5,226,213 A * | 7/1993 | Lewis et al. ............... 19/66 R |
| 5,441,160 A | 8/1995 | DeWoolfson et al. |
| 5,492,227 A | 2/1996 | Millette et al. |
| 5,622,457 A * | 4/1997 | Thiele ........................ 406/1 |
| 6,619,525 B2 | 9/2003 | Frankeburger et al. |
| 6,789,715 B2 | 9/2004 | Frankeberger et al. |
| 6,942,133 B2 | 9/2005 | Frankeberger et al. |
| 6,996,955 B2 * | 2/2006 | White et al. ............... 53/495 |

OTHER PUBLICATIONS

Dillon, Jr., Joseph A.; Office Action dated May 2, 2007, cited in related divisional U.S. Appl. No.: 11/625,070.
Matthews, Terrell Howard; Office Action dated May 2, 2007, cited in related divisional U.S. Appl. No.: 11/625,058.

* cited by examiner

*Primary Examiner*—Joe Dillon, Jr.
(74) *Attorney, Agent, or Firm*—Lathrop & Gage LC

(57) ABSTRACT

A system for pneumatically conveying flexible fabric items such as uniforms and table linens has a pair of side outlets at each discharge location to enhance the discharge capacity. Each side outlet is provided with a gate to open and close the outlet. A hopper having a chute receives the items discharged through the corresponding outlet. A sling cart or other bin underlies each chute. When a cart is full, hopper doors can be closed to allow the hopper to serve as a temporary holding bin while the conveying system continues to operate without interruption as the full cart is moved and replaced by an empty cart.

16 Claims, 2 Drawing Sheets

METHOD AND APPARATUS FOR CONVEYING FLEXIBLE FABRICS USING DUAL SIDE OUTLETS

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This invention relates generally to the handling of flexible fabric or plastic items such as uniforms, table linens and other articles that are commonly handled by commercial laundries and other facilities. More particularly, the invention is directed to a method and apparatus for conveying and sorting flexible fabric items using a conveying system having dual side outlets.

BACKGROUND OF THE INVENTION

U.S. Pat. No. 6,619,525 to Frankeberger et al. discloses a pneumatic fabric conveyor which is used to deliver flexible fabric items from a sorting area or table to receptacles such as sling carts. The discharge end of the conveyor system is provided with bottom outlets that are controlled by flapper valves which direct the fabric items into receptacles arranged in a row beneath the outlets.

Although this construction functions well, it is subject to capacity limitations due to the single row of receptacles that must be located directly below the conveyor tube. Additionally, when a sling cart is full, no more articles can be discharged through the corresponding outlet until the full cart has been moved and replaced by an empty cart. The ability of the system to function efficiently and at a high capacity is reduced as a result of these limitations.

SUMMARY OF THE INVENTION

The present invention constitutes an improvement in the system shown in U.S. Pat. No. 6,619,525. In particular, the principal goal of the invention is to increase the capacity and efficiency of a pneumatic conveying and sorting system of the type shown in that patent. A counting or weighing control device may or may not be used.

More specifically, it is an object of the invention to provide a method and apparatus for conveying flexible fabric items that makes use of a pair of side outlets at each discharge location, thereby doubling the discharge capacity without adding to the linear space that is occupied by the conveying system.

Another object of the invention is to provide a method and apparatus of the character described in which each outlet may be provided with a hopper that receives the fabric items and directs them through a chute into an underlying receptacle such as a sling cart, or a sling on a monorail.

An additional object of the invention is to provide a method and apparatus of the character described in which the hopper chutes may be equipped with doors that can be closed to allow the underlying cart to be replaced while fabric items continue to be loaded into the hopper. By using the hoppers as holding bins in this manner, the conveying operation can continue uninterrupted while full carts are replaced as necessary with empty carts. As a result, the throughput of the system is not adversely effected by the need to interchange carts.

A further object of the invention is to provide a method and apparatus of the character described wherein the space occupied by the conveyor equipment is minimized. In this regard, the capacity can be doubled without adding to the linear space required by the equipment.

Yet another object of the invention is to provide a method and apparatus of the character described that is distinguished by simplicity, low cost and ease of use.

Other and further objects of the invention, together with the features of novelty appurtenant thereto, will appear in the course of the following description.

BRIEF DESCRIPTION OF THE SEVERAL VIEWS OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 1:
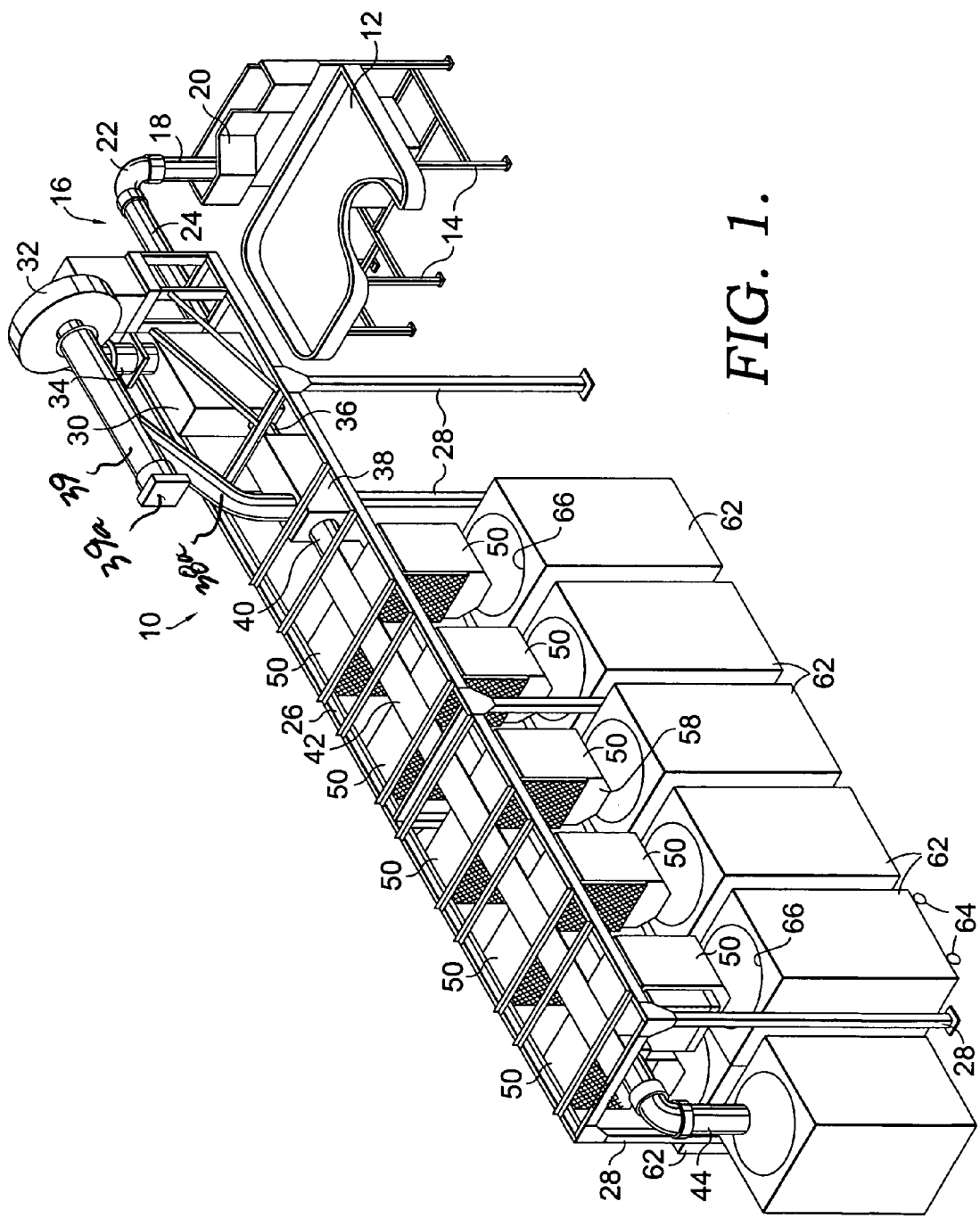
FIG. 1 is diagrammatic perspective view of a fabric conveying system that is equipped with dual side outlets in accordance with a preferred embodiment of the present invention.

Referring now to the drawings in more detail and initially to FIG. 1 in particular, numeral 10 generally designates a pneumatic conveying system that is used to convey flexible fabric items such as table lines (tablecloths, napkins and the like), uniforms, and other articles that are commonly laundered in commercial laundry or other textile industry facilities, as well as other types of flexible fabrics, plastic bags or other lightweight flexible material that can be pneumatically conveyed in other applications. A sorting table 12 or a similar sorting station may be supported on legs 14 and used for the sorting of fabric articles that are to be conveyed by the conveying system 10. The sorting table 12 is located at the inlet end of the conveying system and connected with the piping of the conveying system.

The conveying system includes a closed conveyor tube which is generally identified by numeral 16. The conveyor tube 16 extends from the sorting table 12 and is located for the most part at an overhead location, although other locations are possible. The length, size and configuration of the conveyor tubing can be varied as desired to accommodate the space that is available and the application in which the conveying system is used.

The conveyor tube 16 may include a vertical inlet tube 18 that extends upwardly from a trough 20 on the sorting table 12. The tube 18 provides an inlet to the conveyor system 12 through which the fabric articles are fed. The top end of tube 18 connects through an elbow fitting 22 with a horizontal tube 24. A frame 26 may be provided with a plurality of legs 28, or the frame 26 may be supported otherwise such as by being suspended from a ceiling. The frame 26 provides support for the overhead tubing and a venturi which is generally identified by numeral 30. The venturi 30 may be of the type shown in U.S. Pat. No. 6,619,525 which is incorporated by reference as disclosing a type of venturi construction that can be used in the conveyor system 10.

Tube 24 extends to the venturi 30. A blower 32 has its discharge side 34 connected with the venturi 30 in order to provide a low pressure area in the venturi 30 for drawing fabric items through the conduits 18 and 24 and conveying them downstream from the venturi 30, as disclosed in U.S. Pat. No. 6,619,525. The downstream end of the venturi 30 is provided with a horizontal tube 36 that may lead to a vent structure 38 which provides a vent effect as disclosed in U.S. Pat. No. 6,619,525.

Alternatively, the vent of vent structure 38 may connect with a return pipe 38a. The return pipe 38a may connect with a horizontal conduit 39 which connects with the inlet side of blower 32. An adjustable door 39a on the end of conduit 39 may be slid to expose more or less of the end of conduit 39 to adjust the fresh air intake area to conduit 39. This closed loop system is advantageous in many respects compared to a simple vent system, although the present invention contemplates a simple vent system as well as the closed loop system shown in the drawings.

The downstream side of the vent structure 38 connects with a horizontal tube 40 which in turn connects with a square conduit 42 located on the discharge end portion of the conveyor system 10.

Figure 2:
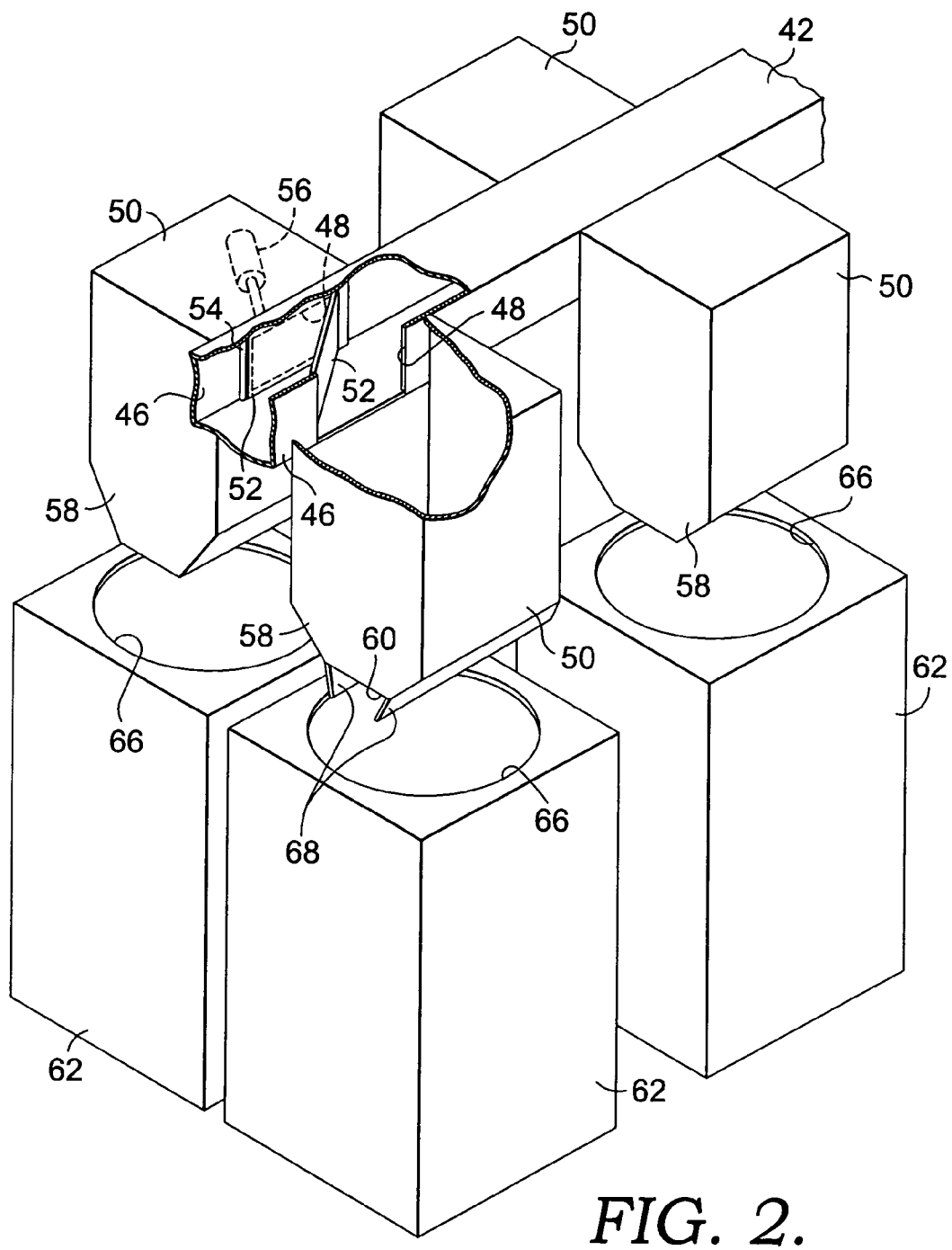
FIG. 2 is a fragmentary perspective view of part of the discharge end portion of the conveying system, with portions broken away to show certain internal details and with the hopper doors on one of the hoppers shown in the open position.

With additional reference to FIG. 2, the conduit 42 has flat opposite sides 46 located in vertical planes. Each of the sides 46 is provided with a plurality of outlets 48, with the outlets being arranged in aligned pairs located on opposite sides 46 of conduit 42. The outlets 48 open into the upper end portions of respective hoppers 50 which are connected with the opposite sides 46 of conduit 42 and supported in part by the frame 26. One of the hoppers 50 is provided for each of the outlets 48. By way of example, FIG. 1 shows an arrangement in which there are five of the outlets 48 on each side of conduit 42 so that there are five of the hoppers 50 on each side of conduit 42. Hoppers 50 are arranged in pairs located on opposite sides of the conduit 42, and the hoppers 50 on each side of the conduit are arranged in a straight row extending parallel to conduit 42 and located slightly to one side of it.

Referring again to FIG. 2 in particular, each of the outlets 48 is provided with a gate 52. Each gate 52 is mounted on a vertical shaft 54 which may be rotated to move the gate 52 between open and closed positions. In the closed position of gate 52, the gate covers the corresponding outlet 48 to close the outlet 48 and prevent fabric items from discharging through it. In the open position of gate 52 (shown for one of the gates in FIG. 2), the gate is swung inwardly such that it intercepts fabric items passing through the conduit 42 and prevents them from moving downstream past the open gate. The open gate 52 exposes the corresponding outlet 48 and deflects the incoming fabric item or items through the open outlet 48 and into the corresponding hopper 50. The gates 52 thus act as valves for the outlets 48 and may be moved between the open and closed positions by a pneumatic cylinder 56 or by any other suitable actuating means.

Each of the hoppers 50 is provided on its lower end with a chute 58 which presents a discharge opening 60 in the bottom end of each chute. Immediately underlying each of the hoppers 50 is a receptacle 62 which may take the form of a sling cart or bin mounted on wheels (or a sling hanging from a overhead monorail system) 64 (see FIG. 1). Each of the receptacles 62 has an opening 66 in its upper end which underlies the discharge opening 60 in the bottom of the corresponding hopper 50. There is one receptacle 62 for each hopper 50, and the receptacles 62 are arranged in two straight rows located on opposite sides of conduit 42.

Chute 58 of each hopper 50 may be provided with a pair of hopper doors 68 which are used to open and close the opening 60. When the doors 68 are closed, they block the opening 60 and cause the fabric items in the hopper 50 to be retained within the hopper. When the doors 68 are opened, the opening 60 is exposed so that the fabric items within the hopper 50 are discharged by gravity through opening 60 and into the underlying receptacle 62 through opening 66. The doors 68 of each hopper may be opened and closed by pneumatic cylinders or any other suitable means that can be actuated as needed.

The end of conduit 42 may connect with a vertical tube 44 (see FIG. 1) or, more preferably, with a hopper and bin system like those described previously. Thus, if all of the doors 52 are closed, the items that are being conveyed are directed into the hopper on the end and eventually into the bin on the end.

In operation of the system 10, the fabric items or other lightweight flexible items are loaded into the conveying system through the inlet tube 18. Blower 32 and venturi 30 create a low pressure region which draws the fabric items through the conveyor tube 16 and conveys them into the conduit 42 on the discharge end of the conveying system. The vent effect provided by the vent 38 assists in the conveying operation.

As the fabric items are conveyed through conduit 42, gates 52 are selectively opened and closed to direct the fabric items into proper hoppers 50. The fabric items may be provided with indicia which may be read by suitable sensors in the conveying system in order to identify and/or count each particular fabric item and open and close the gates 52 in a manner to direct that item into the hopper 50 that is appropriate for that particular fabric item. Only one of the gates 52 is open at any time, so each of the fabric items is directed into the appropriate hopper 50 as determined by the open gate. The doors 68 of the hoppers 50 are normally open, so the fabric items that are directed into the hoppers are delivered from the hoppers into the underlying receptacles 62. Thus, for example, all uniform shirts of a particular type can be directed into one of the receptacles 62, napkins can be directed into another of the receptacles 62, and tablecloths can be directed into still another of the receptacles 62.

When one of the receptacles 62 is full of materials, doors 68 of the overlying hopper 50 can be temporarily closed (automatically or by the action of a human operator) so that the full receptacle 62 can be moved and replaced with an empty receptacle while the conveying operation continues uninterrupted and the fabric materials continue to be loaded into the hopper 50. While its doors 68 are closed, the hopper 50 accumulates the fabric items within it and thus serves as a holding bin while the receptacles 62 are interchanged. Once an empty receptacle 62 has been moved into place beneath the hopper 50, doors 68 can be opened again, and the fabric items that have accumulated within the hopper 50 are then discharged into the receptacle 62.

By providing a pair of the outlets 48 at each discharge location along the length of the conduit 42, the discharge capacity of the conveyor is doubled in comparison to the unit shown in U.S. Pat. No. 6,619,525 which has only a single bottom outlet at each discharge location. The throughput is thus doubled in this fashion without the need to increase the length of the conveyor tubing. The receptacles 62 are located in two separate straight rows which are located generally on opposite sides of the conduit 42 so that they add slightly to the overall width but not to the length. Additionally, by using the hoppers 50 as temporary holding bins when the receptacles 62 are full, the conveying operation can continue uninterrupted while the receptacles are interchanged, thus increasing the throughput and efficiency of the conveying operation.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

The invention claimed is:

1. Apparatus for conveying lightweight flexible items, comprising:
   a conduit having an input end portion for receiving said items and a discharge end portion having opposite sides;
   venturi means in said conduit between said input and discharge end portions;
   a blower applying air to said venturi means to draw and push said items through the conduit from said input end portion to said discharge end portion;
   a plurality of outlets in each of said sides of said discharge end portion;
   a valve for each of said outlets for effecting an open condition of the conduit wherein said items discharge from said conduit through a corresponding open outlet and a closed condition of each valve's respective outlet wherein the outlet is closed to prevent discharge of said items therethrough; and
   a receptacle underlying each outlet for receiving the items discharging through the outlet;
   wherein said receptacles comprise hoppers adjacent to said outlets and wherein said discharge end portion has an exit for discharging items not discharged through any respective outlet, said outlets being positioned between said exit and said input end portion.

2. Apparatus as set forth in claim 1, wherein said receptacles are arranged in two substantially straight rows with said rows underlying the outlets on the opposite sides of said discharge end of the conduit.

3. Apparatus as set forth in claim 1, including a hopper door on each hopper having an open position discharging items from the hopper and a closed position retaining items in the hopper.

4. Apparatus as set forth in claim 3, including a plurality of bins underlying the respective hoppers for receiving the items therefrom when the hopper doors are in the open position.

5. Apparatus as set forth in claim 1, wherein said hoppers are connected to said discharge end portion of the conduit.

6. Apparatus as set forth in claim 5, wherein said opposite sides of said discharge end portion comprise substantially flat surfaces to which said hoppers are connected.

7. Apparatus as set forth in claim 1, wherein said hoppers are arranged in a pair of substantially straight rows extending generally along the opposite sides of said discharge end portion.

8. Apparatus as set forth in claim 7, including a bin underlying each of said hoppers for receiving said items therefrom, said bins being arranged in a pair of substantially straight rows.

9. An apparatus for conveying lightweight flexible items, comprising:
   a conduit having an input end portion for receiving said items and a discharge end portion having opposite sides;
   venturi means in said conduit between said input and discharge end portions;
   a blower applying air to said venturi means to draw and push said items through the conduit from said input end portion to said discharge end portion;
   a plurality of outlets in each of said sides of said discharge end portion;
   a valve for each of said outlets for effecting an open condition of the conduit wherein said items discharge from an opposed conduit through a corresponding open outlet and a closed condition of each valve's respective outlet wherein said outlet is closed to prevent discharge of said items therethrough;
   a temporary holding device adjacent each outlet for temporarily receiving said items discharging through said outlet, each temporary holding device having a door movable between an open position discharging items from said temporary holding device and a closed position retaining items in said temporary holding device; and
   a plurality of bins underlying said respective temporary holding devices for receiving said items therefrom when said doors on said temporary holding devices are in said open position and wherein said discharge end portion has an exit for discharging items not discharged through any respective outlet, said outlets being positioned between said exit and said input end portion.

10. An apparatus for conveying lightweight flexible items, the apparatus comprising:
    a conduit having an inlet for receiving the items and a discharge end portion for discharging the items;
    a venturi in communication with the conduit between the inlet and the discharge end portion;
    a blower in communication with the venturi to draw and push the items through the conduit from the inlet to the discharge end portion;
    a plurality of outlets in the discharge end portion, each respective outlet being selectively covered by a respective gate;
    means for selectively moving each respective gate to selectively cover and uncover each respective outlet and wherein in one configuration said uncover blocks said conduit; and
    a plurality of hoppers, each respective hopper being coupled to the conduit discharge end portion adjacent a respective outlet for receiving items in said one configuration;
    wherein each hopper has a hopper door movable between a first position allowing the items to automatically pass through the hopper and a second position retaining the items in the hopper and wherein said discharge end portion has an exit for discharging items not discharged through any respective outlet, said outlets being positioned between said exit and said input end portion.

11. The apparatus of claim 10, wherein at least two of the outlets are laterally adjacent one another.

12. The apparatus of claim 10, wherein a distance along the conduit from the inlet to a first respective outlet is generally the same as a distance along the conduit from the inlet to a second respective outlet.

13. The apparatus of claim 12, wherein a distance along the conduit from the inlet to a third respective outlet is generally the same as a distance along the conduit from the inlet to a fourth respective outlet.

14. The apparatus of claim 12, further comprising a plurality of bins for placement below each respective hopper to receive the items therefrom, the bins being arranged in a pair of substantially straight rows.

15. The apparatus of claim 12, wherein:
the conduit discharge end portion has opposed first and second side walls;
the first side wall defines the first outlet; and
the second side wall defines the second outlet.

16. The apparatus of claim 15, wherein:
the conduit discharge end portion has an end;
an uncovered outlet is adjacent the conduit end; and
at least one of a hopper or a bin is adjacent the uncovered outlet for receiving the items passing therethrough.

* * * * *